United States Patent [19]

Kotani et al.

[11] Patent Number: 5,380,572
[45] Date of Patent: Jan. 10, 1995

[54] PRESSURE SENSITIVE ADHESIVE LABEL SHEET

[75] Inventors: Terumitsu Kotani, Yokohama; Atusi Saitoh; Tomoya Yamada, both of Chiba; Kohei Tachikawa, Toda; Yasuyuki Amano, Urawa; Takeshi Ikeda, Warabi, all of Japan

[73] Assignee: Lintec Corporation, Tokyo, Japan

[21] Appl. No.: 40,191

[22] Filed: Mar. 31, 1993

[30] Foreign Application Priority Data

Aug. 26, 1992 [JP] Japan .................................. 4-226966
Sep. 18, 1992 [JP] Japan .................................. 4-274950

[51] Int. Cl.$^6$ ........................ B32B 27/06; B32B 27/32
[52] U.S. Cl. ..................................... 428/40; 428/195; 428/218; 428/219; 428/220; 428/323; 428/409; 428/483; 428/511; 428/513; 428/520; 428/523; 524/430; 525/240
[58] Field of Search ................. 428/40, 195, 219, 220, 428/218, 448, 352, 354, 353, 483, 523, 520, 513, 409, 323, 511; 526/352.2, 352; 525/240; 427/535; 524/430

[56] References Cited

U.S. PATENT DOCUMENTS

| | | | |
|---|---|---|---|
| Re. 32,929 | 5/1989 | Ewing | 428/220 |
| 3,853,595 | 12/1974 | Pedginski et al. | 428/156 |
| 3,956,254 | 5/1976 | St. Eve | 526/352 |
| 5,151,309 | 9/1992 | Dollinger | 428/40 |
| 5,186,782 | 2/1992 | Freedman | 156/244.11 |
| 5,194,324 | 3/1993 | Poirier | 428/315.5 |

FOREIGN PATENT DOCUMENTS

86/01550 3/1986 WIPO.

*Primary Examiner*—Nasser Ahmad
*Attorney, Agent, or Firm*—Millen, White, Zelano & Branigan

[57] ABSTRACT

A transparent pressure sensitive adhesive label sheet comprises a label film comprising a polyethylene resin of a density of 0.925 to 0.950 g/cm$^3$ as the main component thereof, having an average of the tensile strength to the MD direction and the tensile strength to the TD direction of 250 kg/cm$^2$ or more, a 1% secant modulus to the MD direction of 2500 to 5000 kg/cm$^2$, a haze of 3 to 15% and a gloss of 80% or more and provided with the property suitable for printing by a surface treatment and a release paper laminated with the label film through a layer of a pressure sensitive adhesive material. An opaque pressure sensitive adhesive label sheet is about the same as the above except that it comprises a label film having a total light transmission of 40% or less in place of the haze and the gloss described above. The pressure sensitive adhesive label sheet shows excellent appearance when label marks are printed on the transparent film or on the white opaque film, follows the elongation of the substrate well even after being printed and can be handled smoothly in the process using an automatic labelling machine.

8 Claims, No Drawings

PRESSURE SENSITIVE ADHESIVE LABEL SHEET

BACKGROUND OF THE INVENTION

1. Field of the Invention

The present invention relates to a novel pressure sensitive adhesive label sheet comprising a label of a plastic film coated with a pressure sensitive adhesive layer. More particularly, it relates to a pressure sensitive label sheet comprising polyethylene film which shows excellent appearance when label marks are printed on it and can be handled smoothly in the process using an automatic labelling machine.

2. Description of the Prior Art

Beautiful labels are attached to many commercial containers for the purposes of advertisement, good appearance of design and the like.

The labels are generally attached to containers automatically by transferring the adhesive labels having a pressure sensitive adhesive material from a release paper of a label tape to the surface of the containers by using an automatic labelling machine. The label tape is generally prepared by temporarily attaching a label sheet of 25 to 250 μm thickness having label marks printed on it to a release paper through a layer of a pressure sensitive adhesive material and then by cutting out the label sheet alone to the shape of the label.

A film of a rather stiff material, such as PET, PVC and the like, has been generally utilized for the pressure sensitive adhesive label because of easier operation of the labelling but a film of a soft material, such as polyethylene and the like, has not been utilized.

However, when a film of a rather stiff material, such as PET, PVC and the like, is utilized for a label on a soft flexible container, physical properties of the film cannot match the flexibility of the container and wrinkling and lifting are often formed. When they are formed, the shape of the label is deformed and the appearance of the printing is deteriorated.

For solving the problem, a pressure sensitive adhesive label made of a low density polyethylene film as a label for squeeze bottles was disclosed (U.S. Pat. Nos. 4,587,158; Re 32,929). Pressure sensitive adhesive labels generally tend to become more fragile when they are printed. When the printed pressure sensitive adhesive label of a low density polyethylene disclosed in the patent described above is attached to a substrate having flexibility, the label may be fractured because the printed label has a lower tensile strength and cannot follow the elongation of the substrate. This label has another problem that it causes difficulty in the operation of the automatic labelling machine because of the lower stiffness.

Conventional transparent polyethylene films have a problem that printed marks do not show up clearly when the label marks are printed on the film and the appearance as a label is inferior.

SUMMARY OF THE INVENTION

The present invention accordingly has an object to provide a pressure sensitive adhesive label sheet which has excellent appearance when a label mark is printed on a transparent film or on a white opaque film, follows the elongation of the substrate well even after being printed and can be handled smoothly in the process by an automatic labelling machine.

Extensive investigations undertaken by the present inventors with the object described above lead to a discovery that a polyethylene film having a specific density, a specific tensile strength and a specific 1% secant modulus is effective for achieving the object. The present invention has been completed on the basis of the discovery.

Thus, the present invention comprises Invention 1 and Invention 2 suitable for a transparent label film and an opaque label film, respectively, as described in the following.

Invention 1. A pressure sensitive adhesive label sheet which comprises a label film comprising a polyethylene resin of a density of 0.925 to 0.950 g/cm$^3$ as the main component thereof, having an average of the tensile strength to the MD direction and the tensile strength to the TD direction of 250 kg/cm$^2$ or more, a 1% secant modulus to the MD direction of 2500 to 5000 kg/cm$^2$, a haze of 3 to 15% and a gloss of 80% or more and a release paper laminated with the label film through a layer of a pressure sensitive adhesive material and a pressure sensitive adhesive label sheet which comprises the label film described above, printed on the surface thereof and cut out to the shape of a label and a continuous release paper laminated with the label film through a layer of a pressure sensitive adhesive material. The label film may be additionally provided with the property suitable for printing by a surface treatment.

Invention 2. A pressure sensitive adhesive label sheet which comprises a label film comprising a polyethylene resin of a density of 0.925 to 0.950 g/cm$^3$ as the main component thereof and 5 to 15 weight % of titanium dioxide, having an average of the tensile strength to the MD direction and the tensile strength to the TD direction of 250 kg/cm$^2$ or more, a 1% secant modulus to the MD direction of 2500 to 5000 kg/cm$^2$ and a total light transmission of 40% or less and a release paper laminated with the label film through a layer of a pressure sensitive adhesive material and a pressure sensitive adhesive label sheet which comprises the label film described above, printed on the surface thereof and cut out to the shape of a label and a continuous release paper laminated with the label film through a layer of a pressure sensitive adhesive material. The label film may be additionally provided with the property suitable for printing by a surface treatment.

Other and further objects, features and advantages of the invention will appear more fully from the following description.

DETAILED DESCRIPTION OF THE INVENTION

The pressure sensitive adhesive label sheet of the invention comprises a label film which comprises a polyethylene resin as the main component thereof.

Kind of the polyethylene resin utilized in the label film of the invention is not particularly limited so long as the polyethylene resin has the specified density. For example, the polyethylene resin can be suitably selected from a low density polyethylene (LDPE) and/or a linear low density polyethylene (LLDPE) or a blend of these materials with a high density polyethylene (HDPE).

Density of the polyethylene resin utilized for the label film of the invention is generally in the range from 0.925 to 0.950 g/cm$^3$ and preferably in the range from 0.940 to 0.948 g/cm$^3$.

When the density is less than 0.925 g/cm$^3$, the stiffness is reduced and troubles take place during the automatic labelling operation. When the density is higher than 0.950 g/cm$^3$, gloss of the surface is often inferior.

When a single kind of the polyethylene resin is utilized, the range of the density specified in the invention is naturally the same as the range of the density of the polyethylene resin utilized. However, when a blend of two or more kinds of the polyethylene resins is utilized, the range of the density specified in the invention is not based on the measured density of the blend but on the calculated density of the blend from the densities of the component polyethylene resins and the composition of the component resins in the blend.

The density of the individual polyethylene resin is measured according to the method of Japanese Industrial Standard K-6760.

Melt index of the polyethylene resin utilized in the invention is preferably in the range from 0.1 to 8 g/10 minutes and more preferably in the range from 0.5 to 4 g/10 minutes.

As the polyethylene resin which is the main component of the label film, a low density polyethylene (LDPE) and/or a linear low density polyethylene (LLDPE) or a blend of these materials with a high density polyethylene (HDPE) can be utilized. A resin composition which is a blend of a low density polyethylene and a high density polyethylene is preferably utilized among them.

Other additives conventionally utilized for polymers, such as antistatic agents, lubricating agents, blocking preventing agents and the like, may be suitably comprised in the material of the label film within the range that the object of the invention is not adversely affected.

The label film of the invention can be prepared by molding the material comprising the polyethylene resin as the main component thereof. The method of preparation of the film is not particularly limited but various conventional methods, such as the method of inflation molding which is generally utilized for polyethylene resins and the like other methods, can be adopted.

The label film of the invention has specified properties other than the density. The average of the tensile strength to the MD direction and the tensile strength to the TD direction measured according to the method of Japanese Industrial Standard Z-1702 is 250 kg/cm$^2$ or more and the 1% secant modulus to the MD direction is in the range from 2500 to 5000 kg/cm$^2$. The label film has also the total light transmission of 40 % or less (Invention 2) and is provided with the property suitable for printing.

The physical properties of the label film of the invention described above are the properties immediately before the label mark is printed on the film.

The average of the tensile strength to the MD direction and the tensile strength to the TD direction of the label film of the invention is 250 kg/cm$^2$ or more, preferably 270 kg/cm$^2$ or more and more preferably 300 kg/cm$^2$ or more. When the average tensile strength of the label film is less than 250 kg/cm$^2$, the film becomes fragile by the decrease of the tensile strength after the printing. The tensile strength of the polyethylene film has a certain upper limit because of the material properties of polyethylene. However, the tensile strength is sufficiently high for the application of the film in the invention when it is about 300 kg/cm$^2$ though still higher strengths do not make any harm.

The 1% secant modulus of the label film is particularly specified in the invention and measured according to the method of Japanese Industrial Standard K-7127.

It is in the range from 2500 to 5000 kg/cm$^2$ and preferably in the range from 2600 to 4600 kg/cm$^2$ to the MD direction. When the 1% secant modulus of the label film of the invention is less than 2500 kg/cm$^2$, a large number of defect products are formed during the automatic labelling process and, when the 1% secant modulus is more than 5000 kg/cm$^2$, the film does not follow the deformation of the substrate sufficiently.

The 1% secant modulus is the property corresponding to Young's modulus and can represent the stiffness of the label film of the invention more accurately than Young's modulus.

The haze of the transparent label film of the invention (Invention 1) measured according to the method of Japanese Industrial Standard K-7105 is in the range from 3 to 15% and preferably in the range from 3 to 10%. The lower the value of the haze, the better the appearance of the printed transparent label film. When the value of the haze is more than 15%, the appearance of the printed transparent label film is inferior.

The gloss of the transparent label film of the invention (Invention 1) measured according to the method of Japanese Industrial Standard K-7105 is 80% or more and preferably 90% or more. The higher the value of the gloss, the better the appearance of the printed transparent label film. When the value of the gloss is less than 80%, the appearance of the printed transparent label film is inferior.

Molecular weight distribution of the polyethylene utilized in the transparent label of the invention (Invention 1) is represented by the ratio of the weight average molecular weight ($M_w$) to the number average molecular weight ($M_n$) and in the range from 3 to 7, preferably in the range from 4 to 6. When the ratio representing the molecular weight distribution is more than 7, the transparency and the gloss of the film is decreased. Molecular weight distribution of polyethylene is generally 3 or more.

The total light transmission of the opaque label film of the invention (Invention 2) measured according to the method of Japanese Industrial Standard K-7105 is 40% or less and preferably 30% or less.

When the total light transmission is more than 40%, color of the surface of the container to which the label is attached is often seen through the printed face of the label. Beautiful contrast of the printed marks on the opaque white background of the label film made with titanium oxide is also deteriorated.

The lower total light transmission reduces aging of the pressure sensitive adhesive material which attaches the label to the container and thus enhances durability of the label.

Titanium dioxide is generally comprised in the opaque label film of the invention (Invention 2) as the opaque white pigment. Mixing of the titanium dioxide can be made easier when it is mixed to the low density polyethylene to form a master batch which is then utilized as one of the materials for the label film.

When the master batch is utilized, the density of the polyethylene resin described above is calculated from the components including the low density polyethylene comprised in the master batch.

When the label film is printed on it, it is preferred that, after the label film is formed by molding, the label film is treated with a surface treatment for providing the film with the property suitable for printing, such as corona discharge treatment, coating of a coating material like polyester coating material, resin coating material containing inorganic powder. The method of corona discharge and the method of coating of a polyester coating material are more preferable among them.

Though the pressure sensitive adhesive label sheet may be prepared from the label film of the invention by directly coating the label film with a conventional pressure sensitive adhesive material, it is more generally prepared by coating a release paper with a pressure sensitive adhesive material and then by laminating the coated release paper with the label film of the invention. The printing on the label film can be performed either before or after the lamination. After the lamination, a long sheet of the label tape is prepared by cutting out the label film layer alone to the shape of the label, leaving the release paper as a long sheet. The other parts of the label film are removed from the release paper. The labels on the label tape can be transferred to containers or the like by passing the long sheet of the label tape through an automatic labelling machine.

As the releasing material laminated with the label film through the pressure sensitive adhesive material, conventional release papers can be utilized without any particular restriction. A preferable example of the release material is a release paper prepared by treating a paper sheet with a sealer and then by coating with a silicone releasing agent.

A soft flexible film, such as a soft polyvinyl chloride film, a low density polyethylene film and the like, may be laminated to the outer face of the label sheet of the invention.

The invention will be understood more readily with reference to the following examples; however, these examples are intended to illustrate the invention and are not to be construed to limit the scope of the invention.

EXAMPLE 1

A film of 80 μm thickness was prepared from a low density polyethylene resin (density, 0.930 g/cm$^3$; melt index, 1.0 g/10 minutes; $M_w/M_n$, 5.3) by an inflation molding.

The molecular weights were measured by the gel permeation chromatography with trichlorobenzene as the eluent at 140° C. and the value of $M_w/M_n$ was obtained from the result of the measurement.

The label film prepared above was treated with the corona discharge, coated with an acrylic pressure sensitive adhesive material and laminated with a release paper. The label film was printed on the surface and the label film alone is cut out to the form of the label to obtain a pressure sensitive adhesive label sheet.

Tensile strength to the MD direction, tensile strength to the TD direction, 1% secant modulus, haze and gloss of the label film were measured. The label film had the tensile strength to the MD direction of 260 kg/cm$^2$, the tensile strength to the TD direction of 251 kg/cm$^2$ and the average tensile strength of 255.5 kg/cm$^2$.

The 1% secant modulus to the MD direction was 3160 kg/cm$^2$.

The gloss was 95%.

A face of the film prepared above was treated with the corona discharge and then printed with marks in which shapes of a label of a circle of 50 mm diameter were arranged continuously with a 10 mm distance between the circles.

A silicone release paper was coated with an acrylic pressure sensitive adhesive material by a conventional method and then laminated with the transparent polyethylene film prepared above by placing the printed face outside.

The label film portion alone of the laminated film was cut out to the shape of a label of a circle of 50 mm diameter by a circular blade without cutting the release paper portion and the cut out label film portion was left attached on the release paper while the other portions of the label film were removed from the release paper. The pressure sensitive adhesive label sheet thus prepared was passed through an automatic labelling machine MD-1 ® manufactured by LINTEC CORPORATION at the labelling speed of 26 m/minute for the labelling test in which 300 labels were automatically attached on commercial polyethylene bottles. The bottle had the height of 180 mm and the width of 60 mm and the label was attached to the middle of the face of the bottle in the position that the low end of the label is 50 mm above the low end of the bottle.

No bottle having imperfect attachment of the label was found in this labelling test.

Five pieces of the circular label of 50 mm diameter were peeled off from the release paper of the label sheet prepared above and attached to the middle of five commercial catchup bottles with one label on each bottle. The middle part of the label was pushed with a round tip of a metal rod of 10 mm diameter until the pushed side of the bottle makes close contact with the other side of the bottle and the bottle was left standing in this condition for 3 days in a room of 23° C. and 65% humidity. Then, the condition of the label was visually observed to evaluate the property of the label to follow the deformation of the bottle and no lifting of the label was found.

Comparative Example 1

A pressure sensitive adhesive label sheet was prepared and evaluated by the same method as in Example 1 except that a low density polyethylene having the density of 0.930 g/cm$^3$, the melt index of 7.0 g/10 minutes and the $M_w/M_n$ of 9.0.

The label film had the tensile strength to the MD direction of 238 kg/cm$^2$, the tensile strength to the TD direction of 216 kg/cm$^2$ and the average tensile strength of 227 kg/cm$^2$.

The 1% secant modulus to the MD direction was 3240 kg/cm$^2$.

The gloss was 97%.

No bottle having imperfect attachment of the label was found in the labelling test.

In the test to evaluate the property of the label to follow the deformation of the bottle, no lifting of the label was found and the condition was good. However, the tensile strength after the printing was reduced and the label could not be served for use because the label was fragile.

EXAMPLE 2

A pressure sensitive adhesive label sheet was prepared and evaluated by the same method as in Example 1 except that a resin composition comprising a low density polyethylene having the density of 0.930 g/cm$^3$, the melt index of 1.0 g/10 minutes and the $M_w/M_n$ of 5.3 and a high density polyethylene having the density of 0.951 g/cm$^3$, the melt index of 0.5 g/10 minutes and the $M_w/M_n$ of 6.2 in the ratio of 80:20 (calculated density 0.9341 g/cm$^3$ = 100/(80/0.930+20/0.951)) was used and that the thickness of the label film was 70 μm.

The label film had the tensile strength to the MD direction of 322 kg/cm², the tensile strength to the TD direction of 296 kg/cm² and the average tensile strength of 309 kg/cm².

The 1% secant modulus to the MD direction was 3600 kg/cm².

The gloss was 87%.

No bottle having imperfect attachment of the label was found in the labelling test.

The test to evaluate the property of the label to follow the deformation of the bottle gave good result.

Comparative Example 2

A pressure sensitive adhesive label sheet was prepared and evaluated by the same method as in Example 1 except that a high density polyethylene having the density of 0.950 g/cm³, the melt index of 0.8 g/10 minutes and the $M_w/M_n$ of 6.2.

The label film had the tensile strength to the MD direction of 338 kg/cm², the tensile strength to the TD direction of 312 kg/cm² and the average tensile strength of 325 kg/cm².

The 1% secant modulus to the MD direction was 11050 kg/cm².

The gloss was 51%.

No bottle having imperfect attachment of the label was found in the labelling test.

In the test to evaluate the property of the label to follow the deformation of the bottle, lifting of the label from the bottle face was observed on all of the labels attached on the five bottles.

Comparative Example 3

A pressure sensitive adhesive label sheet was prepared and evaluated by the same method as in Example 1 except that a low density polyethylene having the density of 0.921 g/cm³, the melt index of 3.0 g/10 minutes and the $M_w/M_n$ of 12.3 was used.

The label film had the tensile strength to the MD direction of 198 kg/cm², the tensile strength to the TD direction of 167 kg/cm² and the average tensile strength of 182 kg/cm².

The 1% secant modulus to the MD direction was 2220 kg/cm².

The gloss was 65%.

In the labelling test, 126 defective labels were found among 300 pieces tested.

In the test to evaluate the property of the label to follow the deformation of the bottle, good result was obtained. However, the tensile strength after the printing was reduced and the label could not be served for use because the label was fragile.

EXAMPLE 3

An opaque white film of 50 mm width and 70 μm thickness was prepared by an inflation molding from a composition prepared by mixing 50 weight parts of a high density polyethylene resin (density, 0.954 g/cm³ and melt index, 1.1 g/10 minutes), 50 weight parts of a low density polyethylene resin (density, 0.930 g/cm³ and melt index, 1.5 g/10 minutes) and 20 weight parts of a master batch comprising 60 weight % of titanium dioxide in a low density polyethylene (density, 0.920 g/cm³ and melt index, 6.0 g/10 minutes). The calculated density of the composition as a blended polyethylene resin was 0.9402 as shown in the equation:

The calculated density = $108/(50/0.954 + 50/0.930 + 8/0.920) = 0.9402$

Tensile strength to the MD direction, tensile strength to the TD direction, 1% secant modulus and total light transmission of the label film were measured.

The label film prepared above had the tensile strength to the MD direction of 290 kg/cm², the tensile strength to the TD direction of 250 kg/cm² and the average tensile strength of 270 kg/cm². The 1% secant modulus to the MD direction was 3990 kg/cm². The total light transmission was 25%.

A face of the film prepared above was treated with the corona discharge and then printed with marks in which shapes of a label of a circle of 50 mm diameter were arranged continuously with a 10 mm distance between the circles.

A silicone release paper was coated with an acrylic pressure sensitive adhesive material by a conventional method and then laminated with the opaque polyethylene film prepared above by placing the printed face outside.

The label film portion alone of the laminated film was cut out to the shape of the circular label of 50 mm diameter by a circular blade without cutting the release paper portion and the cut out label film portion was left attached on the release paper while the other portions of the label film were removed from the release paper. The label adhesive sheet thus prepared was passed through an automatic labelling machine MD-1 ® manufactured by LINTEC CORPORATION at the labelling speed of 26 m/minute for the labelling test in which 300 labels were automatically attached on commercial polyethylene bottles. The bottle had the height of 180 mm and the width of 60 mm and the label was attached to the middle of the face of the bottle in the position that the low end of the label is 50 mm above the low end of the bottle.

No bottle having imperfect attachment of the label was found in this labelling test.

Five pieces of the circular label of 50 mm diameter were peeled off from the release paper of the label sheet prepared above and attached to the middle of five commercial catchup bottles with one label on each bottle. The middle part of the label was pushed with a round tip of a metal rod of 10 mm diameter until the pushed side of the bottle makes close contact with the other side of the bottle and the bottle was left standing in this condition for 3 days in a room of 23° C. and 65% humidity. Then, the condition of the label was visually observed to evaluate the property of the label to follow the deformation of the bottle and no lifting of the label was found.

EXAMPLE 4

An opaque label film having the same width and the same thickness as the film of Example 3 and the calculated density of 0.9406 was prepared by the same method as in Example 3 except that a composition prepared by mixing 70 weight parts of a high density polyethylene (density, 0.954 g/cm³ and melt index, 1.1 g/10 minutes), 30 weight parts of a linear low density polyethylene (density, 0.916 g/cm³ and melt index, 3.3 g/10 minutes) and 20 weight parts of the same master batch as in Example 3 was used.

The label film prepared above had the tensile strength to the MD direction of 370 kg/cm², the tensile strength to the TD direction of 320 kg/cm$^2$ and the average tensile strength of 345 kg/cm$^2$. The 1% secant modulus to the MD direction was 4570 kg/cm$^2$. The total light transmission was 27%.

No bottle having imperfect attachment of the label was found in the labelling test conducted by the same method as in Example 3. The test to evaluate the property of the label to follow the deformation of the bottle gave good result.

EXAMPLE 5

An opaque label film having the same width and the same thickness as the film of Example 3 and the calculated density of 0.9433 was prepared by the same method as in Example 3 except that a composition prepared by mixing 75 weight parts of a high density polyethylene resin (density, 0.954 g/cm$^3$ and melt index, 1.1 g/10 minutes), 25 weight parts of a low density polyethylene (density, 0.930 g/cm$^3$ and melt index, 1.5 g/10 minutes), 15 weight parts of a linear low density polyethylene (density, 0.916 g/cm$^3$ and melt index, 1.0 g/10 minutes) and 20 weight parts of the same master batch as in Example 3 was used.

The label film prepared above had the tensile strength to the MD direction of 320 kg/cm$^2$, the tensile strength to the TD direction of 300 kg/cm$^2$ and the average tensile strength of 310 kg/cm$^2$. The 1% secant modulus to the MD direction was 4400 kg/cm$^2$. The total light transmission was 26%.

No bottle having imperfect attachment of the label was found in the labelling test conducted by the same method as in Example 3. The test to evaluate the property of the label to follow the deformation of the bottle gave good result.

Comparative Example 4

An opaque label film having the same width and the same thickness as the film of Example 3 was prepared by the same method as in Example 3 except that a composition prepared by mixing 100 weight parts of a high density polyethylene (density, 0.954 g/cm$^3$ and melt index, 1.1 g/10 minutes) and 20 weight parts of the same master batch as in Example 3 was used.

The label film prepared above had the tensile strength to the MD direction of 560 kg/cm$^2$, the tensile strength to the TD direction of 520 kg/cm$^2$ and the average tensile strength of 540 kg/cm$^2$. The 1% secant modulus to the MD direction was 5610 kg/cm$^2$. The total light transmission was 29%.

No bottle having imperfect attachment of the label was found in the labelling test conducted by the same method as in Example 3.

In the test to evaluate the property of the label to follow the deformation of the bottle, partial lifting of the label from the face of the bottle was found in all of the five labelled bottles tested.

Comparative Example 5

An opaque label film having the same width and the same thickness as the film of Example 3 was prepared by the same method as in Example 3 except that a composition prepared by mixing 100 weight parts of a low density polyethylene (density, 0.930 g/cm$^3$ and melt index, 1.5 g/10 minutes) and 20 weight parts of the same master batch as in Example 3 was used.

The label film prepared above had the tensile strength to the MD direction of 250 kg/cm$^2$, the tensile strength to the TD direction of 200 kg/cm$^2$ and the average tensile strength of 225 kg/cm$^2$. The 1% secant modulus to the MD direction was 2800 kg/cm$^2$. The total light transmission was 28%.

In the labelling test conducted by the same method as in Example 3, 5 labels showed imperfect attachment to the bottles. In the test to evaluate the property of the label to follow the deformation of the bottle, good result was obtained.

Comparative Example 6

An opaque label film having the same width and the same thickness as the film of Example 3 was prepared by the same method as in Example 3 except that a composition prepared by mixing 100 weight parts of a linear low density polyethylene (density, 0.920 g/cm$^3$ and melt index, 1.0 g/10 minutes) and 20 weight parts of the same master batch containing titanium oxide as in Example 3 was used.

The label film prepared above had the tensile strength to the MD direction of 570 kg/cm$^2$, the tensile strength to the TD direction of 470 kg/cm$^2$ and the average tensile strength of 520 kg/cm$^2$. The 1% secant modulus to the MD direction was 2100 kg/cm$^2$. The total light transmission was 28%.

In the labelling test conducted by the same method as in Example 3, 52 labels showed imperfect attachment to the bottles. In the test to evaluate the property of the label to follow the deformation of the bottle, good result was obtained.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the pressure sensitive adhesive label sheet of the invention has excellent workability in automatic labelling machines, property to follow the deformation of flexible containers, appearance of printed marks and weatherability.

What is claimed is:

1. A pressure sensitive adhesive label sheet which comprises a transparent label film comprising a polyethylene resin of a density of 0.925 to 0.950 g/cm$^3$ as the main component thereof, having an average of the tensile strength to the MD direction and the tensile strength to the TD direction of 250 kg/cm$^2$ or more, a 1% secant modulus to the MD direction of 2500 to 5000 kg/cm$^2$, a haze of 3 to 15% and a gloss of 80% or more and a release paper laminated with the label film through a layer of a pressure sensitive adhesive material, wherein the ratio of the weight average molecular weight to the number average molecular weight of the polyethylene resin is in the range from 3 to 7.

2. A pressure sensitive adhesive label sheet as claimed in claim 1 wherein the label film rendered for printing by a surface treatment.

3. A pressure sensitive adhesive label sheet as claimed in claim 2 wherein the surface treatment is a treatment with corona discharge or a coating of a polyester coating material.

4. A pressure sensitive adhesive label sheet which comprises a transparent label film comprising a polyethylene resin of a density of 0.925 to 0.950 g/cm$^3$ as the main component thereof, having an average of the tensile strength in the MD direction and the tensile strength in the TD direction of 250 kg/cm$^2$ or more, a 1% secant modulus to the MD direction of 2500 to 5000 kg/cm², a haze of 3 to 15% and a gloss of 80% or more, printed on the surface thereof and cut out to the shapes of a label and a continuous release paper laminated with the label film through a layer of a pressure sensitive adhesive material, wherein the ratio of the weight average molecular weight to the number average molecular weight of the polyethylene resin is in the range from 3 to 7.

5. An opaque pressure sensitive adhesive label sheet, which comprises a label film comprising polyethylene resin of a density of 0.925 to 0.950 g/cm³ as the main component thereof and 5 to 15 weight % of titanium dioxide, having an average of the tensile strength to the MD direction and the tensile strength to the TD direction of 250 kg/cm² or more, a 1% secant modulus to the MD direction of 2500 to 5000 kg/cm² and a total light transmission of 40% or less, and a release paper laminated with the label film through a layer of a pressure sensitive adhesive material, wherein the ratio of the weight average molecular weight to the number average molecular weight of the polyethylene resin is in the range from 3 to 7.

6. A pressure sensitive adhesive label sheet as claimed in claim 5 wherein the label film rendered for printing by a surface treatment.

7. A pressure sensitive adhesive label sheet as claimed in claim 6 wherein the surface treatment is a treatment with corona discharge or a coating of a polyester coating material.

8. A pressure sensitive adhesive label sheet which comprises a opaque label film comprising a polyethylene resin comprising a density of 0.925 to 0.950 g/cm³ as the main component thereof and 5 to 15 weight % of titanium dioxide, having an average of the tensile strength in the MD direction and the tensile strength in the TD direction of 250 kg/cm² or more, a 1% secant modulus in the MD direction of 2500 to 5000 kg/cm² and a total light transmission of 40% or less, printed on the surface thereof and cut out to the shape of a label and a continuous release paper laminated to the label film through a layer of a pressure sensitive adhesive material, wherein the ratio of the weight average molecular weight to the number average molecular weight of the polyethylene resin is in the range from 3 to 7.

* * * * *